July 23, 1963

E. C. MYERS 3,098,338

SICKLE GUARD CONSTRUCTION

Filed May 23, 1960

INVENTOR.
EDWARD C. MYERS.

BY

ATTORNEY.

July 23, 1963   E. C. MYERS   3,098,338
SICKLE GUARD CONSTRUCTION
Filed May 23, 1960   3 Sheets-Sheet 2

INVENTOR.
EDWARD C. MYERS
BY
ATTORNEY.

July 23, 1963  E. C. MYERS  3,098,338
SICKLE GUARD CONSTRUCTION
Filed May 23, 1960  3 Sheets-Sheet 3

INVENTOR.
EDWARD C. MYERS
BY
ATTORNEY.

3,098,338
SICKLE GUARD CONSTRUCTION
Edward C. Myers, 105 E. De La Goins St.,
Santa Barbara, Calif.
Filed May 23, 1960, Ser. No. 30,877
5 Claims. (Cl. 56—296)

The present invention relates to cutter bar constructions of the type which are commonly used on harvesting equipment, such as for example, mowers, and more specifically, to such construction which can be used with relatively high speed equipment, which will effect a clean cutting job and not clog in loose material, and the operational efficiency of which will not be diminished when the machine operates in a wet or muddy field.

Heretofore, all designers of cutter bar assemblies worked with the assumption that a guide or comb point was essential for feeding the grass or other material being cut into the knife. Therefore, in all prior cutter bar assemblies the ledger plate projected ahead or forward of the live cutting element, and the guard element for carrying the ledger plate extended still further ahead of or forward of such live cutting element. This design characteristic was probably further initially necessitated by reason of the fact that much hay or grass grew in rocky terrain and that the guards aided in sliding the cutter bar over this rocky terrain. With rare exceptions, hay making in such fields is now in the past. The present need is for a cutter bar assembly for a mower which can be and is operated at three to four times the speed of the old horse-drawn mower, which will do a clean cutting job and which will not clog in loose material such as encountered in finishing a "land" or encountered in loose undergrowths or old hay left from previous cuttings so common in alfalfa fields. Under these conditions, therefore, the live reciprocating cutting element must be even with or project forward of the shear or ledger plate. With a construction such as this, there is no dead or stationary member forward of the live cutting element which tends to pick up or push loose material ahead and away from the cutting element. There consequently is also no clogging of the cutter bar assembly. The elements of the present cutter bar are also so designed, one in relationship to the other, that there are no areas or pockets in which can be accumulated mud or other debris to the extent that the live cutting element can be moved into non-shearing relationship with respect to the shear plate. The cutting efficiency is also substantially improved through a unique inter-relationship of the shear plates with the sickle blades which results in substantially increased shearing action, and consequently, increased cutting efficiency at the same rate of reciprocation of the knife. In effect, the assembly is such that the shear plates provide a continuous track, and in one embodiment, an automatically adjustable continuous track, for the reciprocating cutting element, which besides effecting greatly improved cutting action, also results in less knife sharpening and greater longevity.

It is therefore a primary object of the present invention to generally improve the construction of a cutter bar mechanism.

Another object of the present invention is to provide a cutter bar mechanism in which no dead or stationary member is positioned forwardly of the live cutting element.

Yet another object of the present invention is to provide a cutter bar mechanism wherein the shear plates provide a continuous track for the reciprocating cutting element.

A further object of the present invention is to provide a cutter bar mechanism wherein the most effective relationship between the cutting action of the sickle blades relative to the shearing action of the shear plates is automatically maintained.

A still further object of the present invention is to provide a cutter bar mechanism which is less costly to manufacture, lighter in weight, more durable in operation, and requires less knife sharpening during operation.

Further objects and advantages of the present invention will be more readily apparent to those skilled in the art upon perusal of the following description and drawings in which.

Figure 2:
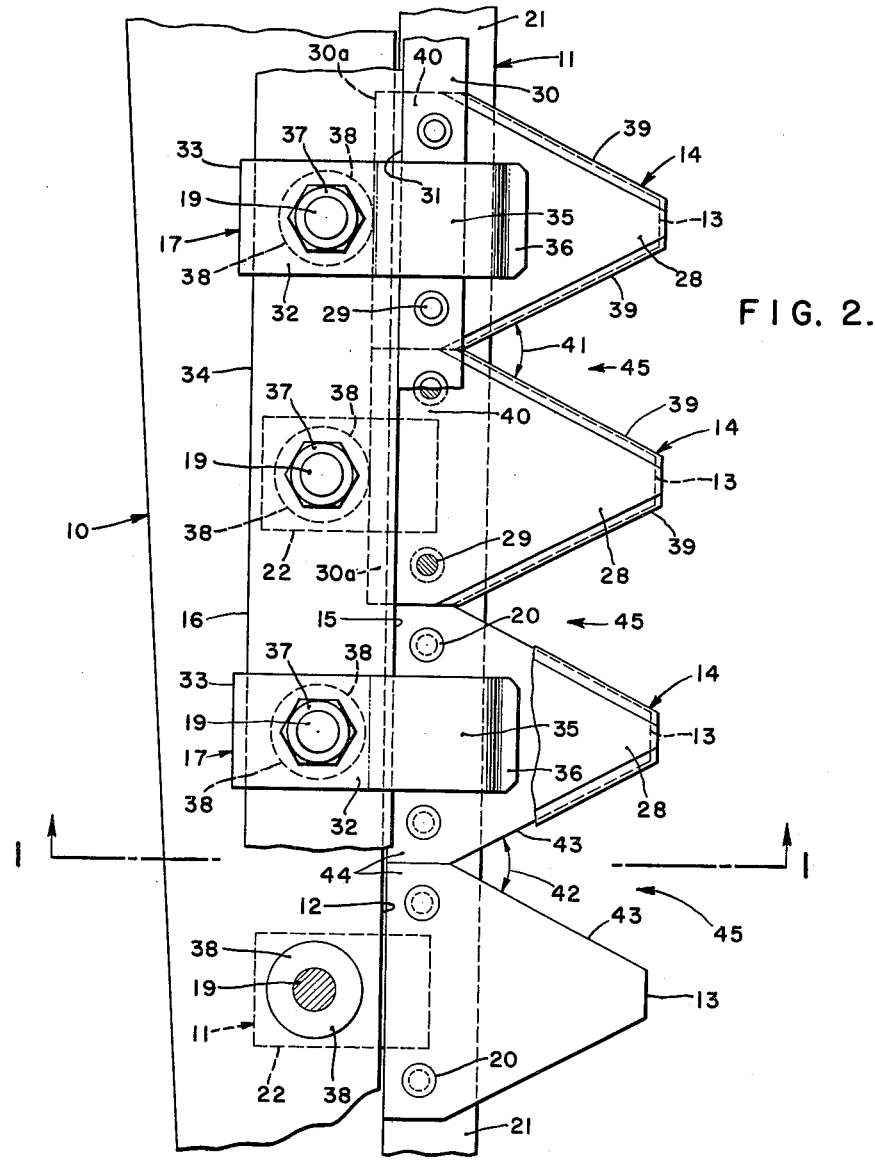
FIG. 2 is a fragmentary plan view of the cutter bar construction shown in FIG. 1, with parts broken away to show details in construction.
Figure 1:
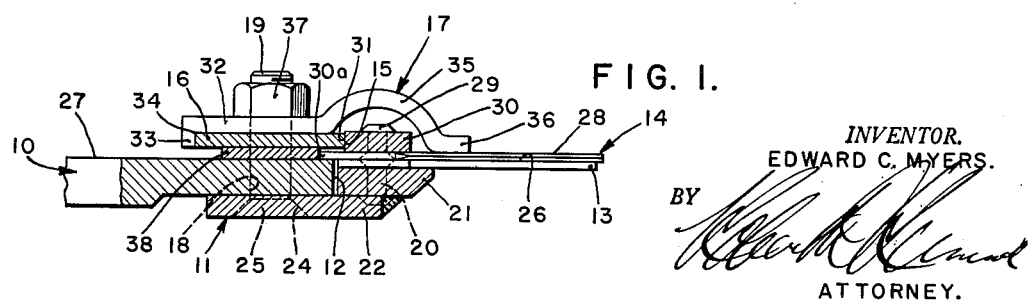
FIG. 1 is a vertical cross-sectional view taken on the line 1—1 of FIG. 2, with parts broken away.

Referring now to the drawings, and particularly to FIGS. 1 and 2 thereof, a cutter bar 10 is provided which extends the length of the assembly in a manner well-known in the art. A shear plate and shear plate support assembly 11 is fixed with respect to a leading edge 12 of the cutter bar so that a plurality of shear plates 13 are positioned in forwardly extending relationship with respect to said cutter bar. A knife assembly 14 is located in shearing or cutting relationship with respect to the shear plates 13 and in reciprocable relationship with respect to a leading edge 15 of a knife guide bar 16. A hold-down clip 17, which can be of any suitable well-known construction, is associated with the knife assembly 14 for well-known purposes and as will be more fully described hereinafter.

The cutter bar 10 can be of any suitable or well-known construction, and in the present instance is formed of bar stock material with a plurality of openings 18 formed therein for reception of suitable hold-down bolts 19. The shear plates 13 of the assembly 11 are fixed by means of suitable rivets 20 to a support bar 21 which extends the length of the assembly. A plurality of anchor brackets 22 are fixed to the support bar 21, the brackets 22 being located in rearwardly extending, pre-determined spaced relationship, and the spaced relationship preferably being such that an opening 24 formed in each of the anchor brackets receives the anchor end 25 of every other bolt 19. The bolts 19, therefore, rigidly hold the anchor brackets 22 to the cutter bar 10 and consequently, the support bar 21 in its forward position with respect to the leading edge 12 of the cutter bar, an upper surface 26 of each of the shear plates being substantially co-planar with an upper surface 27 of the cutter bar.

The knife assembly 14 consists of a plurality of knife or sickle blades 28 fixed as by rivets 29 to a knife bar 30. It will be appreciated that each of the sickle blades is fixed to the undersurface of the knife bar so that the entire undersurface of each of the sickle blades is in sliding engagement with the respective shear plates. It will also be noted that a rearward portion 30a of each of the sickle blades extends sufficiently rearward of the knife bar to ride upon the upper surface 27 of the cutter bar adjacent its leading edge 12, and that a trailing edge 31 of the knife bar is in sliding relationship with respect to the leading edge 15 of the guide bar 16.

The hold-down clip 17, as previously mentioned, can be of any suitable or well-known construction. The hold-down clips specifically disclosed herein each comprises a support portion 32 which has a hook 33 which engages a rear edge 34 of the guide bar 16. The clip is held on its bolt 19 and forwardly has a channel portion 35 which receives the knife bar, and a hold-down portion 36 which is located adjacent the associated sickle blades for well-known purposes.

A nut 37 is threadedly received by each of the hold-down bolts 19 for tightly holding various elements to the cutter bar in the manner previously described, a suitable washer 38 being positioned between the guide bar and the cutter bar. The hold-down clips can be spaced along the length of the cutter bar in a manner dictated by the cutting conditions involved and, in the present instance, such hold-down clips are disclosed as being secured to every other bolt along the length of the cutter bar in the manner indicated.

In reviewing this construction, it will be noted that the sickle blades extend slightly ahead of or forwardly of the forward ends of their respective shear plates. In this manner, there is no dead or non-moving element moving into contact with the material to be cut before the live cutting element—the sickle blades. This positioning of the live cutting element or the sickle blades forwardly of any stationary member prevents the accumulation of loose material ahead of this cutting member which in the past has been the cause of clogging of the entire cutting mechanism. With this construction, the material to be cut, hay for example, is initially contacted by the forward edges of the sickle blades, thereby permitting the cutter bar assembly to efficiently and effectively perform its cutting function. In previous constructions, the live cutting element or the sickle blades were protected by the forwardly extending guards and their usual protective canopies, and these guards, which at one time were considered necessary because of the rocky terrain in which hay was grown, had the inherent tendency by reason of the fact that they came into contact first with the material to be cut, of pushing this material forwardly and ahead of the cutting action of the sickle blades. The end result was that any cutting mechanism having the forwardly extending guards, or any forwardly extending non-cutting element, tended to clog, and particularly so when cutting fairly loose material.

The extent to which the sickle blades extend forwardly of the shear plates is not particularly critical, if they are not otherwise protected by a non-cutting element, such as for example, the usual guard construction. It has been found on a typical cutter bar construction that a forward extension of from 1/16 to 3/32 of an inch is very effective; however, as previously suggested, this distance is not critical.

It will be appreciated that the sickle blades of the present invention are in substantially continuous contact with the shear plates, or stated another way, the shear plates adjacent the rearward edge afford a continuous track for the sickle blades. The sickle blades are of conventional shape, namely, having forwardly converging cutting edges 39 extending from a rear base portion 40. The shear plates are of a shape similar to the sickle blades and of a size substantially the same as that of the shear plates. The cutting edges 39, therefore, of adjacent sickle blades form an angle 41, substantially equal to an angle 42 formed by adjacent cutting edges 43 of adjacent shear plates 13. It will also be noted that a rearward support portion 44 of each of the shear plates is in side-to-side abutting relationship with respect to its adjacent shear plates and the distance between the cutting edges of each shear plate at its widest point is substantially equal to the length of stroke of the knife assembly. With this construction, therefore, and with the knife being at the end of either its inward or outward stroke, the respective sickle blades are positioned in substantially vertical alignment with their associated shear plates. The bite 45, therefore, in which the material to be cut is received is unencumbered, and the sickle blades move into shearing relationship with respect to the shear plates almost immediately upon movement of the knive in its cutting direction. In other words, the angle of the cutting edge of the shear plates is such that the cutting edges of the sickle blades are in shearing contact therewith for approximately 75% of the distance of the stroke of the knife, whereas in conventional cutting mechanisms, this shearing contact is less than 50%. Also, since the rearward support portion 44 of each of the shear plates is in side-to-side abutting relationship with respect to the rear support portions of its adjacent shear plates, and since the rear base portion 40 of each of the sickle blades is likewise in side-to-side abutting relationship with respect to the rear base portions of its adjacent sickle blades, and since the rear base portions 40 of the sickle blades are slideably supported on the rear support portions of the shear plates, such sickle blades are continuously supported during their entire stroke so that accidental misalignment of a sickle blade with respect to its shear plate does not occur.

The effectiveness of the cutting action of an assembly embodying the present invention as compared to prior constructions is, therefore, attributable firstly to the fact that a live cutting element or the sickle blades move first into contact with the material to be cut, and that there is no dead member forwardly of this live member tending to push this material away from the cutting action. Secondly, by forming the shear plates so that the distance between the cutting edge of each plate at its widest point is substantially equal to the length of stroke of the knife, and so that the enclosed angle 41 is substantially equal to the enclosed angle 42, the length of time the cutting edge of the shear plates remains in shearing contact with the cutting edge of its sickle blade is increased substantially, thereby increasing the cutting efficiency of the mechanism without increasing the speed of reciprocation of the knife.

Figures 3, 4:
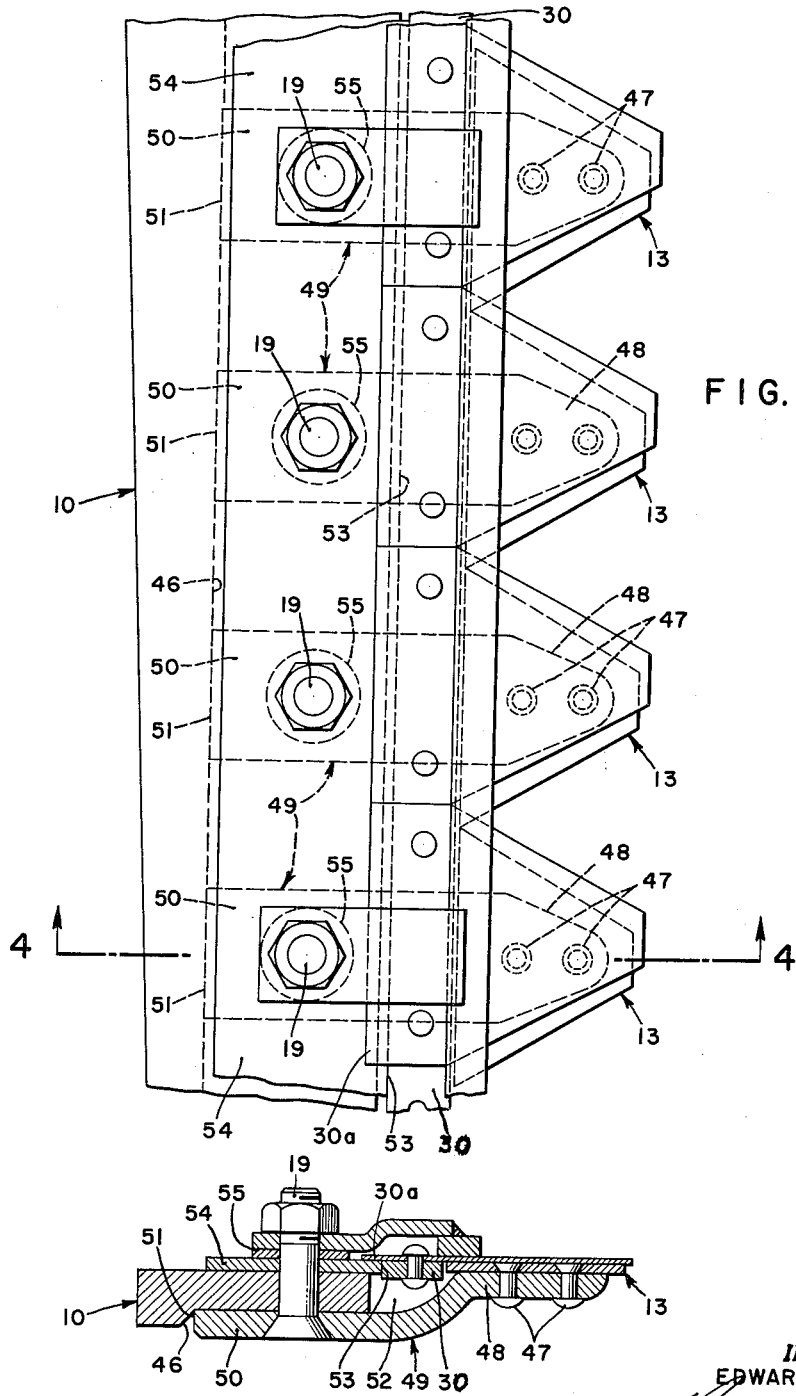
FIG. 3 is a fragmentary plan view illustrating a modified embodiment of the present invention, with parts broken away.
FIG. 4 is a vertical cross-sectional view taken on the lines 4—4 of FIG. 3.

A modification of the invention is disclosed in FIGS. 3 and 4 wherein the cutter bar 10 is provided with a rear abutment edge 46. The shear plates 13 are each individually fixed as by rivets 47 to a support portion 48 of a shear plate support bracket 49, a rear portion 50 of which is fixed by the hold-down bolt 19 to the cutter bar. A rearward edge 51 of each of the brackets 29 is moved into abutment with the abutment edge 46 of the cutter bar for holding each of the support brackets against side-to-side movement and in pre-determined forwardly extending position. A channel 52 is formed in which the knife bar 30 of the knife assembly is accommodated, and the knife assembly is reversed as opposed to the structure shown in FIGS. 1 and 2 so that the knife bar is positioned on the underside. The rearward portion 30a of each of the sickle blades rides upon the upper surface adjacent a leading edge 53 of a wear plate 54. It will also be noted that there is a washer 55 positioned adjacent the wear plate for well-known purposes.

It will also be appreciated that the shear plates have the same angular relationship as described with reference to the design disclosed in FIGS. 1 and 2, and that the sickle blades extend forwardly of the shear plates for increased cutting efficiency.

Figure 6:
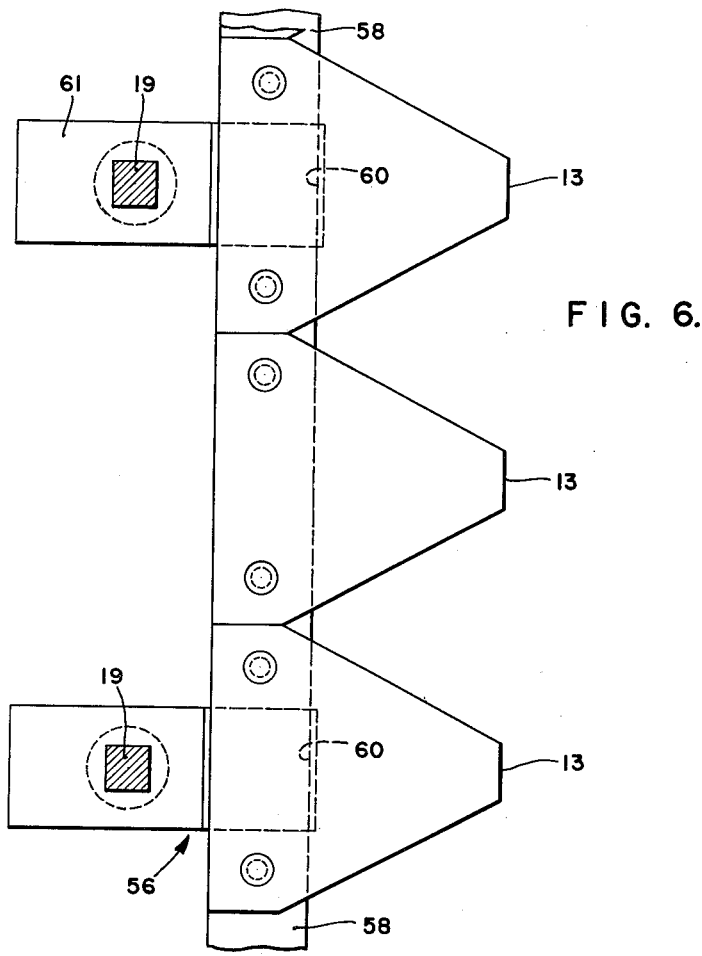
FIG. 6 is a fragmentary plan view of the shear plate and shear plate support assembly disclosed in FIG. 5.
Figure 5:
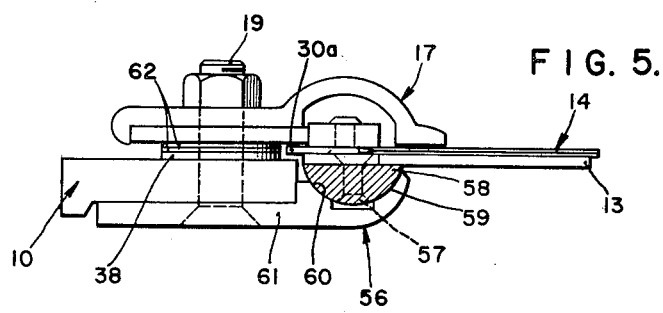
FIG. 5 is a vertical cross-sectional view of a further modified embodiment of the present invention.

The modification disclosed in FIGS. 5 and 6 provides means for the automatic alignment of the shear plates with the sickle blades. More specifically, the shear plates 13 of a shear plate and shear plate support assembly 56 are fixed as by rivets 57 to a support bar 58, such support bar being substantially half oval in cross-section. The support bar 58 is preferably fixed at one end of the cutter bar unit in any suitable manner, not shown, to hold such bar endwise, and like support bar 21 of FIGS. 1 and 2, extends substantially the length of the cutter bar 10. The curved undersurface 59 of the support bar is received in a curved cup portion 60 of a plurality of anchor brackets 61 which, like anchor brackets 22, are fixed to the cutter bar by the hold-down bolts 19. A number of shims 62 are located on the hold-down bolts adjacent the washer 38 so that the sickle blades are carried by the respective shear plate surfaces and held in position by the guide bar 16 and the hold-down clips 17, the rearward portion of the adjacent sickle blades 30a having a clearance by reason of the shims between the guide bar and the cutter bar. Through this clearance and the normal clearance between the sickle blades and the hold-down clips, the knife assembly 14 is free for the required movement to maintain shear contact with the shear plates, and since the reciprocating knife is held in an adjustably fixed horizontal position, and the shear plate unit is free to move horizontally, shearing positions of these cutting elements are automatically maintained. This will be further appreciated when it is noted that the curvature of the undersurface 59 of the support bar 58 and the mating curvature of the cut portion 60 of each of the support brackets is such as to permit only up and down swinging movement, which up and down swinging movement permits the shear plates to be adjusted horizontally into maximum shearing contact with respect to the sickle blades of the knife.

It will also be appreciated that otherwise the relationship of the shear plates with the sickle blades is similar to that described with reference to FIGS. 1 and 2.

What is claimed is:

1. In a cutter bar construction having a cutter bar extending substantially the length of such construction and a knife assembly located adjacent the leading edge of said cutter bar for reciprocal movement with respect thereto, said knife assembly comprising a plurality of sickle blades fixed in forwardly extending substantially side-to-side relationship, each of said sickle blades having a leading edge, a trailing edge and rearwardly diverging cutting edges, the combination of a plurality of shear plates, and a support means for individually supporting each of said shear plates with said cutter bar in substantially side-to-side relationship and forwardly displaced from the leading edge of said guard bar, each of said shear plates having a leading edge, a trailing edge, and rearwardly diverging cutting edges, the leading ede of said sickle blade extending forwardly beyond the leading edge of said shear plate so as to move into initial contact with the material to be cut, and the configuration of each of said shear plates being substantially the same as the configuration of each of said sickle blades, each of said support means having substantially parallel sides and said sides being substantially normal to the trailing edge of its respective shear plate.

2. In a mowing machine, a cutter bar having a leading edge, a shear plate having a leading edge, a trailing edge, and rearwardly diverging cutting edges, a mounting bracket for fixing said shear plate in forwardly extending relation to said cutter bar, said mounting bracket having substantially parallel sides extending forwardly of the leading edge of said cutter bar, and said sides being substantially normal to the trailing edge of its respective shear plate, the leading edge of said mounting bracket terminating short of the leading edge of said shear plate, a sickle blade in shearing relationship with respect to said shear plate, said sickle blade having a leading edge, a trailing edge, and rearwardly diverging cutting edges, the configuration of said shear plate being substantially the same as the configuration of said sickle blade, the leading edge of said sickle blade extending forwardly beyond the leading edge of said shear plate so as to move into initial contact with the material to be cut, and means for moving said sickle blade in cutting relationship to said shear plate.

3. The invention defined in claim 1 further characterized by said shear plates being fixed in side-to-side abutting relationship so that such abutting portions of said shear plates form a continuous track for said sickle blades.

4. The invention defined in claim 1 further characterized by each of said shear plates being formed so that the distance between cutting edges at the widest point is substantially equal to the length of stroke of said knife assembly.

5. The invention defined in claim 1 further characterized by adjacent shear plates having substantially the same open area as that between adjacent sickle blades at the end of the stroke of said knife assembly.

References Cited in the file of this patent

UNITED STATES PATENTS

| | | |
|---|---|---|
| 888,491 | Hampton | May 26, 1908 |
| 960,874 | Flora | June 7, 1910 |
| 1,200,099 | Goodard et al. | Oct. 3, 1916 |
| 1,869,981 | Paradise | Aug. 2, 1932 |
| 2,226,583 | Ronning | Dec. 31, 1940 |
| 2,528,659 | Krause | Nov. 7, 1950 |
| 2,735,254 | Huddle | Feb. 21, 1956 |